United States Patent [19]
Schumacher et al.

[11] Patent Number: 5,527,219
[45] Date of Patent: Jun. 18, 1996

[54] CLEANING SIEVE FOR THE HARVESTED CROP OF AGRICULTURAL MACHINES

[76] Inventors: Gustav Schumacher, Gartenstrasse 8; Friedrich W. Schumacher, Goldwiese 22, both of 57612 Eichelhardt, Germany

[21] Appl. No.: 281,632

[22] Filed: Jul. 28, 1994

[30] Foreign Application Priority Data

Jul. 29, 1993 [DE] Germany ............... 43 25 310.5
Aug. 24, 1993 [DE] Germany ............... 43 28 362.4
Nov. 27, 1993 [DE] Germany ............... 43 40 498.7
Apr. 15, 1994 [DE] Germany ............... 44 12 938.6

[51] Int. Cl.⁶ .................................................. A01F 12/34
[52] U.S. Cl. ..................................................... 460/101
[58] Field of Search ............................. 460/101, 100, 460/102, 94, 95

[56] References Cited

U.S. PATENT DOCUMENTS 4,561,972 12/1985 Alm ............................. 209/254
4,897,072 1/1990 Bestland ..................... 460/101 X
5,176,574 1/1993 Matousek et al. ........... 460/101 X

FOREIGN PATENT DOCUMENTS 4222517 8/1992 Japan ......................... 460/101
1253486 8/1986 U.S.S.R. ..................... 460/101
1442126 12/1988 U.S.S.R. ..................... 460/101
1561890 5/1990 U.S.S.R. ..................... 460/102

*Primary Examiner*—Terry Lee Melius
*Attorney, Agent, or Firm*—Helfgott & Karas

[57] ABSTRACT

A cleaning sieve assembly disposed at the end of and below a transporting conveyor of the harvested crop in the harvesting machine includes an upper or shaff sieve and a lower sieve both subjected to an air current blown from a blower. The upper sieve includes a plurality of inclined sieve zones, which may be descending or ascending in respect to the plane of the sieve with the inclination which is adjustable.

11 Claims, 5 Drawing Sheets

CLEANING SIEVE FOR THE HARVESTED CROP OF AGRICULTURAL MACHINES

BACKGROUND OF THE INVENTION

The invention relates to a cleaning sieve for the harvested crop of agricalutural machine and in particular harvester threshers.

In present-day modern harvester threshers, two sieves one disposed above the other are generally employed wherein the upper one is shaped as a lamellar sieve which separates the coarse chaff and straw particles and the lower one sieves the finer remaining particles. The two sieves are passed by the air current from a blower from below.

The air current lifts the lighter chaff and straw particles so that they are transported by the air current above the sieves and the vibratory movement of the sieves to the rear of the machine and out of it whereas the specifically heavier grains fall through the sieves and are collected in a manner known per se in a grain tank or are filled into sacks.

In modern harvester threshers, the sieves are longer than one meter. Chaff and short straw have to be transported over the whole length of the sieves. The air current is not in this case able to keep the chaff particles coming up at the beginning of the sieve floating over the whole length of the sieve and to transport them toward the rear. Otherwise the air current should be so strong that it could also keep grains afloat and blow them out of the machine together with the chaff.

It has therefore been tried again and again by using mechanical means to keep the chaff and straw particles as far as possible above the upper sieve and contrary thereto conduct the heavier grains from the very beginning to the upper sieve in order to separate grains and chaff at least partly from each other before they fall onto the upper lamellar sieve passed by the air current.

In German Patent Specification No. 908,080, a structure of this sort has been described wherein on the gliding bottom from which the grain-chaff mixture is conducted onto the upper sieve, a rake-like extension is provided which keeps the chaff and straw particles over a certain height above the upper sieve while the grains drop through the rake onto the upper sieve.

A nearly identical apparatus has been described in GDR Patent Specification No. 227,604. In order to loosen the chaff-grain mixture on the upper lamellar sieve, most various sieve structures have been suggested in the past. German Utility Model No. 7,632,151, for instance describes a ramp sieve which is similar to a lamellar sieve in function but has the disadvantage as compared thereto that it comprises square hole openings instead of slit openings as in case of the lamellar sieve.

Such sieves were not successful since an adjustment of the sieve openings, which was obviously necessary with a view to the various kinds of fruit and humidity grades, is not possible in most cases and, secondly, longer straw particles passing through the holes and slipping into the lower sieve will stick fast and after a while will block the whole sieve.

In order to loosen the grain-straw mixture on a lamellar sieve, it has been suggested in German Patent Specification No. 1,238,707 to provide individual lamellae with finger-shaped extensions similar to a rake whereby these lamellae are vibratory relative to the other lamellae, whereby these finger-shaped extensions perform an up and down movement relative to the remaining lamellae and so loosen up the chaff-grain mixture.

This structure was not successful since the vibrating lamellae, on one hand, perform an on-off movement relative to the remaining sieve lamellae, i.e. do not permit a fixed preadjusted value corresponding to the kind of fruit to be harvested, and the wear of the pivotably moving lamella axes, considering a frequency of a couple of hundred movements per minute, leads to a breakdown of the sieve after a short time, on the other.

In German Offenlegungsschrift No. 2,751,842, a rake-like apparatus disposed above the sieve and provided particularly for the corn harvest has been described which however is completely unsuited for loosening a grain-straw mixture considering that the straw and chaff particles dropped under the rake prongs are kept down by these very prongs and hence cannot be pressed upward by the air current. A sieve provided with such an apparatus will be clogged within a short time.

U.S. Pat. No. 4,548,213 describes a sieve also particularly developed for the corn harvest which is inserted without a lower sieve and on which, on one hand, ribs are provided which laterally support the material gliding over the sieve when in inclination, and ondulated transversal ribs, on the other hand, prevent that the corn cobs glide too fast over the sieve and are lost. Such a sieve is not suited for cereals since the effect of a lamellar sieve for controlling the air current is lacking.

In German Patent Specification No. 3,720,696, a rake-like cover device provided above the oversweep area of a sieve box has been described which is to prevent that the grain-chaff mixture collecting on one side, when in an inclined position, is guided in total to the oversweep device of the harvester thresher. This cover is said to effect a last separation of the grains from the mixture. The performance of the sieve above the working zone as such, i.e. before the oversweep area, is not in this case influenced nor is it increased. A similar apparatus has been described in German Offenlegungsschrift No. 4,106,814 wherein, above the oversweep area, enlarged lamellar intermediate spaces are provided which when in an inclined position will guide the collecting grain-chaff mixture to the oversweep. This apparatus, is not in any way suited either to increase the performance of the sieve above the working zone as such.

In both the apparatus according to German Patent Specification No. 3,720,696 and German Offenlegungsschrift No. 4,106,814 referred to above the very opposite effect can be experienced. The oversweep amount obtained in excess because of the larger passages in the oversweep area starts a second trip over the sieve device and increases the crop amount on the sieves to be processed. This can lead to a situation where after a second trip, a third and even multiple trip develops which will overload the sieve to an extent that the machine has to run idly before mowing can be resumed.

The sieve apparatus most effective for the time being has been described in German Offenlegungsschrift 3,704,348. This apparatus comprises a plurality of separated upper sieves provided on different levels. By this arrangement, drop steps are provided between which the air current blows the chaff and straw particles towards the rear portion, in the travelling direction, of the following sieve provided on a lower level. With a view to this arrangement, the dreaded "carpet" which blocks the air current through the sieve cannot develop. The disadvantage of this sieve arrangement however is to be seen in that a vertically much higher space requirement of the sieve box is necessary. The harvester thresher has to be constructed from the very beginning to hold such a sieve arrangement. For space reasons, it will almost never be possible to add this arrangement to machines already available.

SUMMARY OF THE INVENTION

It is an object of the invention to provide a cleaning sieve for the harvested crop of agricultural harvesting machines which yields a considerably higher work performance, which prevents the dreaded carpet formation, produces considerably less oversweep and thereby increases the machine output in total and which as to the space requirements can be installed in place of any common upper or lower sieve.

This and other objects are obtained by a cleaning sieve for the harvested crop of agricultural harvesting machines through which an air current is passed from below and on which the harvested crop is transported by vibratory movement into one direction wherein this cleaning sieve is characterized in accordance with the invention in that one or several zones are provided, which are preferably extending over the complete width and are adjustable in the inclination relative to the remaining sieve plane.

These adjustable zones may be shaped both as ascending and descending zones.

The ascending zones form one or several drop steps to the subsequent sieve section. The air current is directed from below and obliquely rearward through the drop step and blows the lighter chaff and straw particles to the rear and guides them to the subsequent sieve section whereas the specifically heavier grains already drop on the front zone.

On the sieve section obliquely upwardly directed, a rake-like extension is provided, which transports the bigger straw particles further to the rear so that the grains on the sieve zone which follows the oblique section are not mixed again with the chaff and straw particles before they drop through the sieve to the lower sieve.

The sieve zone according to the invention ascending to the rear and upwardly can also consist of lamellae, but it may also be made of prior art nose or hole sieves.

Below the ascending sieve zone according to the invention, the sieve plane is interrupted so that the air current is blown unhindert through the drop step, pushing the chaff to the rear.

Additional air conducting sheets underneath the ascending sieve zone are so adjusted that the air current is distributed at its optimum towards the ascending sieve zone on one hand on onto the developing drop step on the other.

The adjustable sieve zone according to the invention is advantageously adjustable in height relative to the sieve plane. By this arrangement, the inclined position can be adjusted relative to the sieve plane, which is of advantage for different kinds of fruit and harvesting conditions.

Depending on the kind of fruit and on the harvesting conditions, the sieves according to the invention can also be provided with various numbers of adjustable step areas. Depending on the harvesting situation, it will only be necessary to insert a corresponding sieve into the sieve box.

It has furtheron be shown to be of advantage it the sieve consists of individual elements which are composed as a segment sieveon one plane.

The lamellae of the ascending sieve zone as well as those of the remaining lamellar sieve can be adjusted in a manner known per se in the setting angle thereof.

The sieve zones according to the invention are suitably installed in the rear zone (as seen in the transporting direction) of the respective cleaning sieve but in front of the sieve zone which is also height adjustable above the oversweep collector. A sieve arrangement according to the invention above the oversweep area would cause that non-threshed ears are transported via the oversweep area out of the machine. But it is just for such particles that the oversweep area of a sieve device is provided. In most cases, in addition, the sieve above the oversweep area is a particular nose or lamellar sieve following the chaff sieve and has substantially larger passages as has the chaff sieve installed above the lower sieve.

In place of the ascending sieve sections integrated in the cleaning sieve, it is also possible in accordance with the invention to divide the sieve into individual segments. The sieve segment disposed in the base plane is followed by a special sieve element having the ascending structure according to the invention. Subsequently follows a segment disposed in the base plane or a further element according to the invention. In this way, a cleaning sieve can be composed having most various subdivisions. Those ascending zones constitute one or several drop steps to the subsequent sieve section. The air current is conducted from below and obliquely to the rear through the drop step and blows the lighter chaff and straw particles to the rear and guides them to the subsequent sieve section whereas the specifically heavier grains already drop to the front zone. Now it has shown that the possibilities of varying and possibilities of adapting to the respective harvesting process can be considerably improved if, in the sieve according to the invention, one or several zones are provided which are preferably extending over the whole width of the sieve plane and descending relative to the remaining sieve plane.

In accordance with the invention, such an embodiment is obtained in that the horizontal pivot axis of the sieve zone is disposed in the sieve zone area in spaced relationship to the sieve end.

In such an embodiment, when pivoting about the horizontal pivot axis it is possible to lift one portion of the sieve zone whereas the portion disposed on the other side of the sieve zone is lowered. The reverse effect, i.e. lowering on one side and lifting on the other, is also possible.

In accordance with a further advantageous embodiment, the horizontal pivot axis of the sieve zone is disposed in the sieve zone plane at the end of the sieve. By pivoting the sieve zone about the horizontal pivot axis, only one side of the sieve zone is influenced whereas the other end of the sieve zone which coincides with the pivot axis remains unchanged.

Further variation possibilities are obtained, in accordance with a further advantageous embodiment of the invention in that the horizonal pivot axis of the sieve zone is disposed outside the sieve zone plane, i.e. either above the sieve zone plane or below the sieve zone plane.

The sieve zone changed in the inclination is suitably shaped as a lamellar sieve or as a nose sieve. It has furtheron proved to be of advantage if the inclination of the sieve zone(s) changed in the ascension is adjustable relative to the sieve plane and thus can be adapted to the respective requirements of practice.

The variation possibilities obtained by the different inclination of the sieve zone permit an adaptation to the respective harvesting process or the ground contour of the acre to be harvested.

Particularly with a view to the last-mentioned ground contour, it has shown that the cleaning performance of the sieve is substantially increased if the inclination of the sieve sections is adapted to the respective ground contour. When travelling up hill, the sieve sections 3 should be steeper, wenn travelling downhill, they should be more flat.

Considering however that acres to be harvested are very rarely plane but ascending and descending areas are rather alternating, frequent adaptation of the inclination of those sieve zones is necessary if optimum results are to be obtained.

Such an adaptation however is difficult to effect and as a rule requires interruption of the harvesting process.

Such adaptation can be simplified in that according to the invention the inclination adaptation of the sieve zones is performed remote controllably by suitable mechanical, hydraulic, pneumatic and/or electrical means.

Such remote controllable inclination adaptation is suitably performed directly from the operator's seat so that adaptation of the sieve inclination can be performed without interrupting the working process.

Such remote controllable arrangement of the sieve zones adjustable in the inclination thereof is obtained by mechanical means for instance in that a Bowden wire, a cable tow or a respective lever system is conducted from the operator seat to sieve zone adjustable in the inclination, and by means of a corresponding catch device, the adjustment of various sieve inclinations is made possible.

By electrical or electro-magnetic means, furtheron, a corresponding adjustment can be made from the operator's seat as well, and by hydraulic or pneumatic means, finally, remote adjustment of the sieve inclination is also possible whereby the means to be used and the devices are known to those versed in the art so that a detailed description is not necessary.

In accordance with a further advantageous embodiment of the present invention, the inclination adaption of the sieve zones is controlled by a sensor as a function of the longitudinal axis of the machine relative to the horizontal.

Based on such embodiment according to the invention, the sieve inclination adapts, fully automatically, to the respective ground contour so that optimum performance results are obtained.

Experiments performed by the inventors have shown that it is not always necessary to adjust complete sieve zones as to the inclination relative to the base sieve, particularly if the prong rakes provided at the ends of the sieve sections are taken into consideration.

These prong rake extensions which are disposed at the ends of the sieve sections constitute suitable means to perform, either alone or in combination with the adjustable sieve sections, adaptation to the respective ground contour.

With a view to the light-weight embodiment of these prong rake extensions, inclination adaptation of these rakes can be obtained substantially easier and by much less effort as in case of the inclination adaption of the sieve plane.

In particular, such inclination adaptation of the rake prongs in many cases enables an equalization of the ground unevenness to be made so that such, in most cases, compensation can be obtained alone by adjusting the prong rakes.

Based an this surprising observations, the cleaning performance of the sieves is substantially inhanced and the adaptation necessary to the ground contour is simplified in that the prong rakes are pivotably secured to the edge of the sieve zones.

In has shown in this connection that the prong rakes are advantageously secured to a holder pivotable about a horizontal axis.

The pivot range can be about 45 degrees; normally, however, it is below this angular range and corresponds to about the range between two positions of the prong rakes.

The adjustment of the prong rakes can be performed in the same way as in the case of the adjustment of the sieve zones by remote control from the operator's seat. It is however suitable if the adjustment of the prong rakes is performed independently from the adjustment of the sieve zones so that the two adjustment possibilities (prong rakes, on one hand, and sieve zone, one the other) may be made use of either together or separately, if necessary.

Remote control from the operator's seat can very simply be performed by means of electrical, mechanical and/or hydraulic transfer components, wherein the adjustment mechanism can very simply be designed with a view to the relatively light weight of the prong rakes.

With a view to the inclination adjustment of the prong rakes relative to the remaining ascending sieve zone, the latter must considerably less often be adjusted in its inclination. As a rule, it is sufficient if one base adjustment corresponding to the characteristic properties of the blow wind distribution and the flow strength is set and further adaptation to the ground contour if made by adjusting the prong rakes.

In accordance with a further particularly advantageous embodiment of the present invention, adaptation of the prong rakes is achieved automatically by means of sensors responding to the inclination (deviation from the horizontal) of the machine.

The invention will now be explained in more detail based on exemplified embodiments shown in the attached drawings;

DETAILED DESCRIPTION OF THE PREFERRED EMBODIMENT

Figure 1:
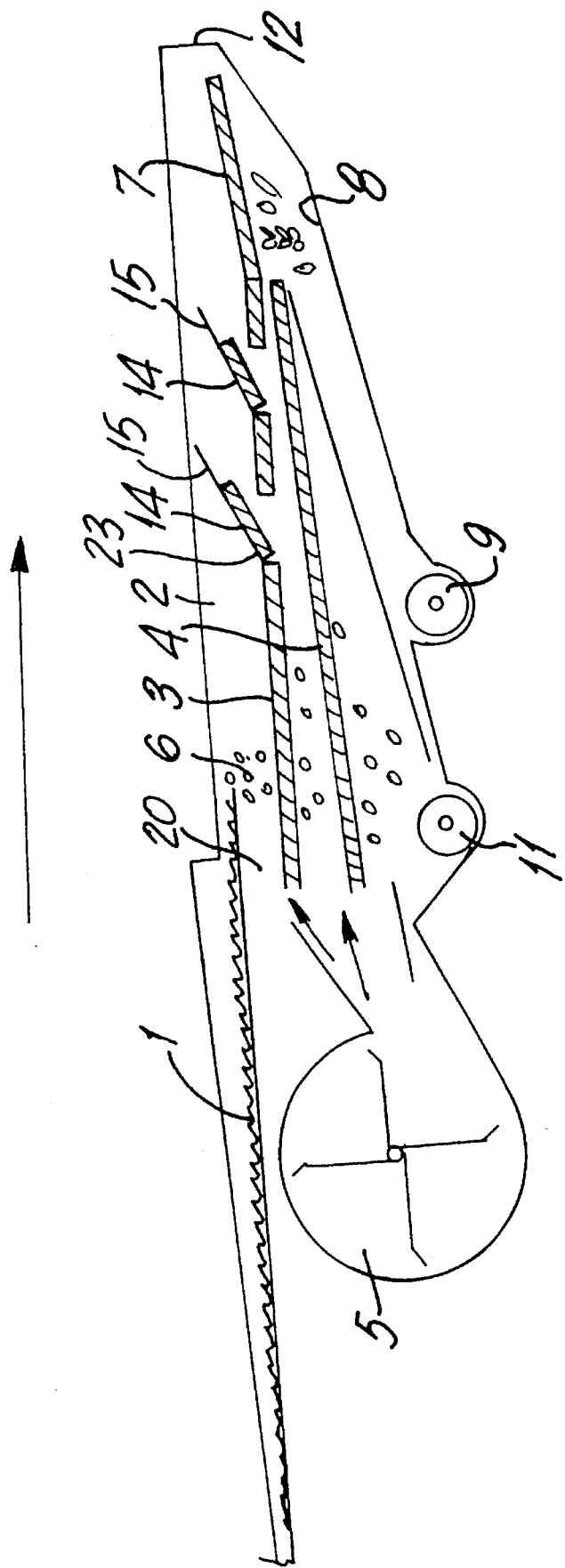
FIG. 1 shows a schematic view of the cleaning apparatus of a harvester thresher in cross section taken along the longitudinal axis of a harvester thresher comprising the chaff sieve according to the invention.

Generally, the cleaning apparatus of a harvester thresher comprises a conveying bottom 1 or conveyor worms (not shown) instead of the conveyor bottom, respectively, which conduct the chaff/short straw/grain mixture separated from the separator organs such as a threshing drum, vibrator or distributing cylinders, to a sieve box 2 comprising upper sieve 3 and lower sieve 4.

The sieves are blown-through by the air current from a blower 5 from below obliquely upward and to the rear. By corresponding air conducting sheets, the air current is generally divided in three. One part is upwardly directed so far that it passes through drop step 6 and already at this spot transports the lighter particles to the rear as seen in the travelling direction. A second part is conducted between upper and lower sieve and blows through the upper sieve 3 from below and, depending on the adjustment of the lamellae, obliquely upward and to the rear. A third partial current is conducted under the lower sieve and also blows upwardly through it.

An extension 7 of the upper sieve having larger passages is provided above the oversweep collector. Because of this extension, havier chaff particles and not-threshed-out ear particles drop onto oversweep chute 8, are conducted from there to oversweep worm 9 and from there to the threshing organs for renewed processing.

The grains of the harvested crop fall through upper sieve 3 onto lower sieve 4, are cleaned again and subsequently drop through it into the collecting box and from there are transported by grain worm 11 to the grain tank.

Very powerful harvester threshers require very long sieves, as seen in travelling direction, since wider sieves based on the structure thereof encounter certain limits. If there is a heavy threshing drum or if there are several of them, on the other hand, the proportion of short straw in the grain-chaff mixture is very high. This proportion bears mainly on the upper sieve 3.

The air current blowing through drop step 6 between conveying bottom 1 and upper sieve 3 does not succeed in blowing the entrained straw and chaff particles over the whole length of the sieve. The straw-chaff particles disposed on the lamellae of the upper sieve are thrown up again and again by the vibratory movement of the sieves, are pushed by the air current to the rear and drop again, a certain distance to the rear, onto the upper sieve.

In case of humid harvested crops and heavy inclinations, a regular thick carpet of chaff-straw particles and grains is formed in most cases on the upper sieve, which blocks the air current. By the vibratory movement, this carpet is conveyed further to the rear and is partly conducted to oversweep zone 7 and partly conveyed beyond the sieve box end 12 out of the machine.

The mixture conveyed to the oversweep deminishes the performance of the machine and the harvested crop embedded in the mixture and conveyed beyond the sieve box end to the outside is lost. This might lead to rather big losses of the harvested crop.

In accordance with the described embodiment of the invention, a plurality of sieve zones 14 ascending relative to sieve plane 13 are now provided which provide additional drop steps on the sieve. These sieve zones 14 have the same width as the base sieve, they can show identical lamellar construction as the base sieve or may be shaped as a nose sieve or ramp sieve.

To the sieve zones 14, rake-like extensions 15 can, though need not necessarily, be secured. The ascending sieve zones 14 can be secured both rigidly and height-adjustably relative to plane 13 of the base sieve to the base sieve. In case of height-adjustable sieve zones 14, the latter are pivotably supported each at a respective about pivot 16 and can be adjusted as to the inclination thereof. The inclination 17 shown by a dashed line depicts the adjustment possibility. The adjustment mechanism can be formed in any shape common to those versed in the art.

Underneath the ascending sieve zones 14, air conducting sheets 18 are provided which conduct one part of the air current blowing from below to one portion of sieve zones 14 and the other part to drop steps 19.

The grain-chaff mixture dropping from conveyor bottom 1 is passed by an air current 20. Thereby, the lighter and disposable particles are blown to the rear to ascending sieve zone 14. The grains included therein partly drop through the sieve openings or lamellae to the lower sieve 4. The chaff-straw particles are conveyed further up and then drop down over the end 21 of ascending sieve zone 14. At that stage, the chaff mixture which still includes grains of the harvested crop is passed by the air current at 19. The lighter particles might be blown further to the rear onto the following zone 14, if any, or to the following rake 15, i.e. they do not drop again onto respective sieve plane 13. The heavier grains on the other hand drop directly onto sieve plane 13 and passing it onto the lower sieve. In the case of a plurality of ascending sieve segments provided one after the other, the lighter particles are normally conveyed from one step to the other without dropping back onto plane 13 of the base sieve. The dreaded mixture carpet of straw, chaff and weeds with the grains included therein cannot anymore develop.

In the drawings, two step zones 14 are provided. Depending on the harvested crop and the harvesting conditions, one such zone, but also three and even more step zones, may be provided.

In most of the cases however, the situation will be such that in the first half of sieve 3 (as seen in the conveying direction), no step zones 14/15 are provided in order to avoid an accumulation of grains whereas in the second half of sieve 3, two or more step zones 14/15 are installed.

Zones 14 ascending in accordance with the invention, whether with or without rake extension 15, can be installed on lower sieve 4 as well. At that location they are suited, when the harvesting machine is travelling uphill, to stop the harvested crop which otherwise will glide too fast over the lower sieve and thus bears on the oversweep device.

As has been described hereinbefore, a cleaning sieve may be composed of a plurality of segments. The base element 13 for instance may terminate at 23; the element according to the invention then terminates at 24. This can be followed by a further element according to the invention or again by only one element resting in the base plane.

The composition of the sieve by individual elements has the advantage that by alternating base elements 13 and elements 14/15 according to the invention, most various sieve compositions corresponding to the harvesting conditions can be installed.

Figure 2:
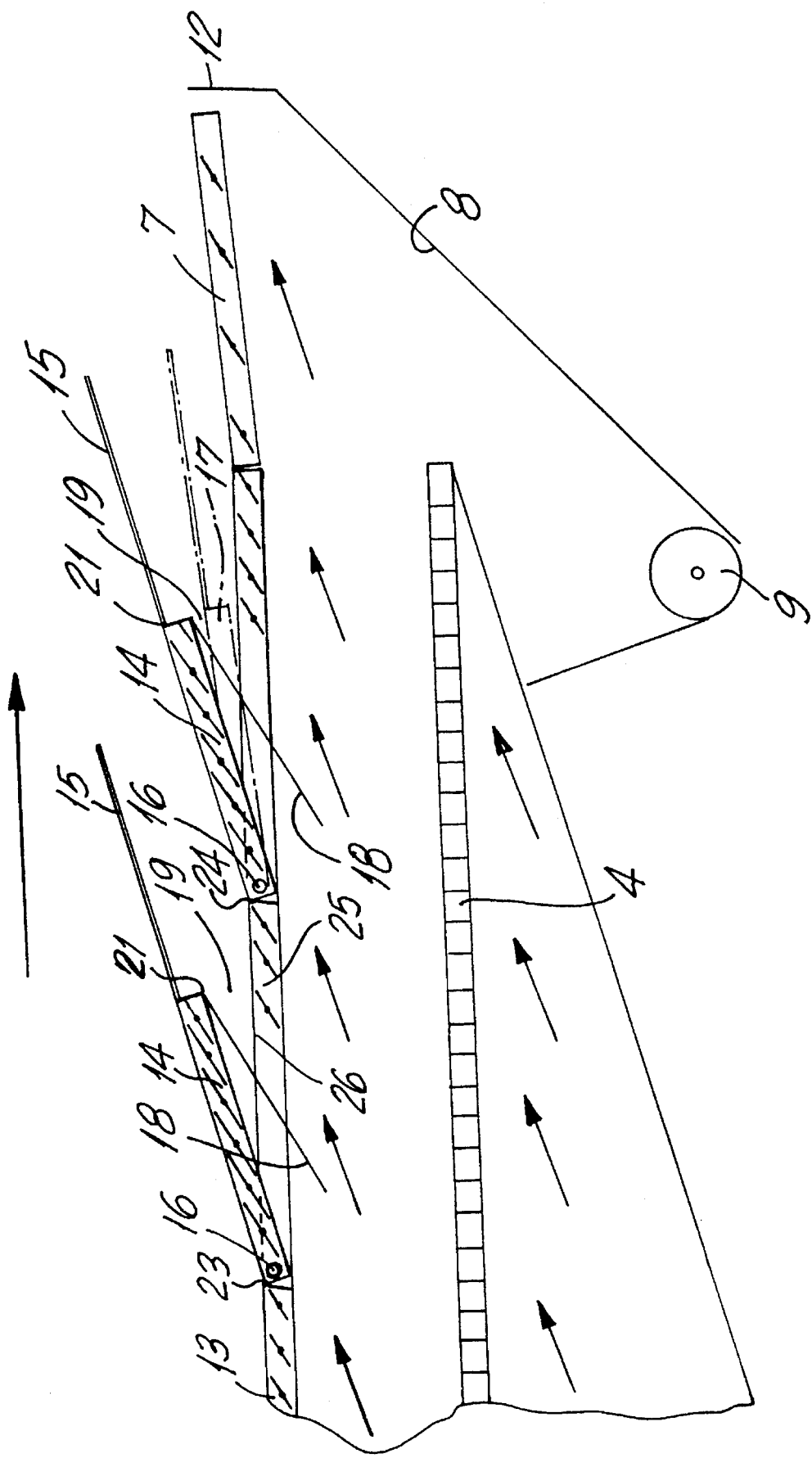
FIG. 2 shows one section according to FIG. 1 depicting a detailed representation of the sieve zone according to the invention.

In the exemplified embodiment according to FIG. 2, the individual elements comprise ascending zone 14/15 and zone 25 which again is embodied in the base plane and terminates at 24.

In accordance with the invention, elements can also be employed which terminate at 21, i.e. which are not led back to the base plane. The following element then starts at about 26.

Such segment elements may both comprise the ascending zone 14 and may include at the respective beginning or the end (as seen in the conveying direction) a further zone in the base plane. From FIG. 3 it can be taken that sieve zones 29 each can pivot about pivot axis 31 respectively and in this way are lifted from sieve zone plane 27 so that they form drop steps. The pivot axis is provided at the beginning of a sieve zone.

Figure 4:
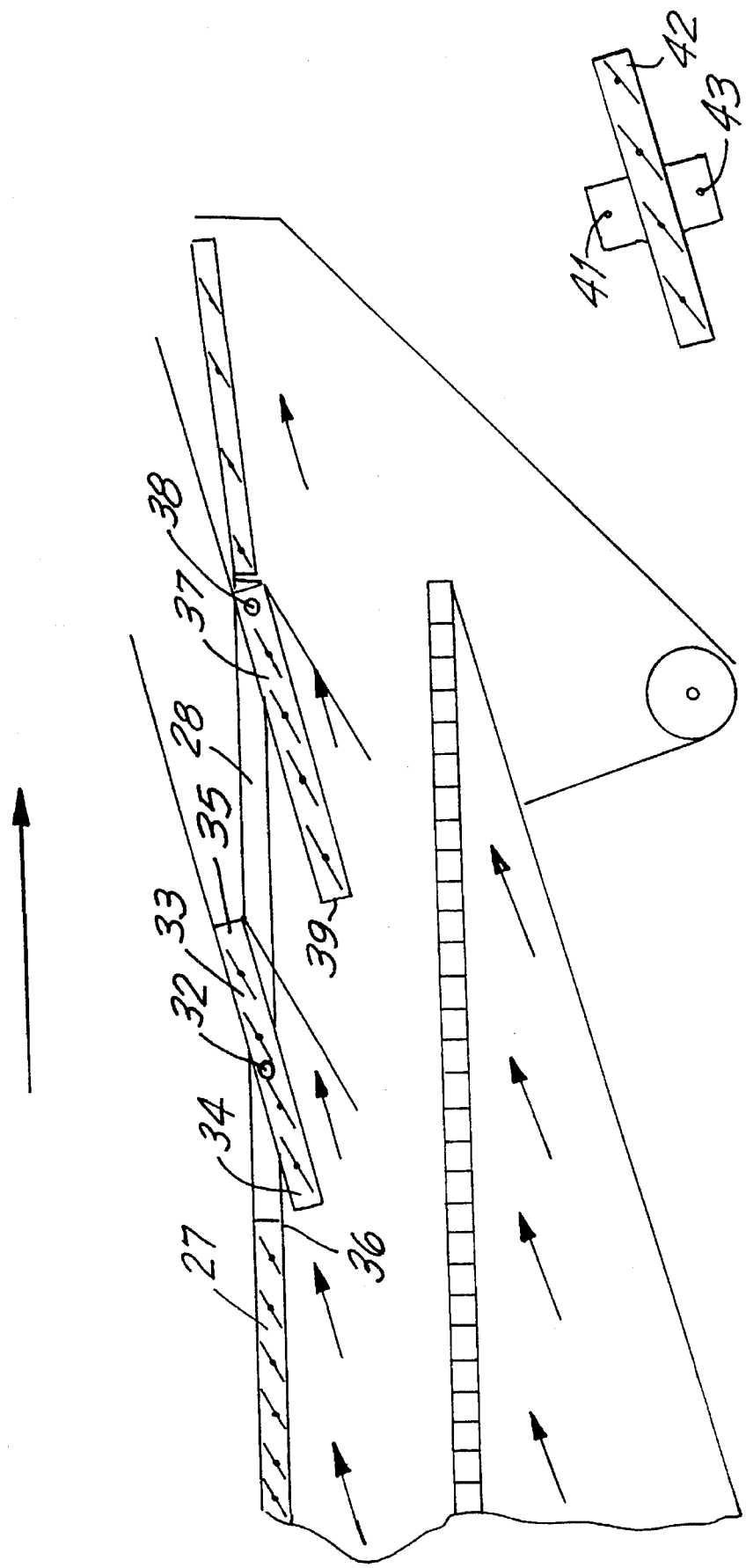
FIG. 4 shows an embodiment according to the invention comprising descending sieve zones.

In the embodiment of the present invention represented by FIG. 4, two pivotable sieve zones are provided which can be pivoted about pivot axis 32 or about pivot axis 38, respectively. In the first case, the beginning of the sieve zone is lowered whereas the zone at the end is lifted up. In the second embodiment of the sieve zone, pivot axis 38 is disposed at the end of the sieve zone in the sieve zone plane. Pivoting about pivot axis 38 causes that the beginning of the sieve zone 39 is lifted, or lowered, respectively, whereas the other end maintains its position.

Figure 3:
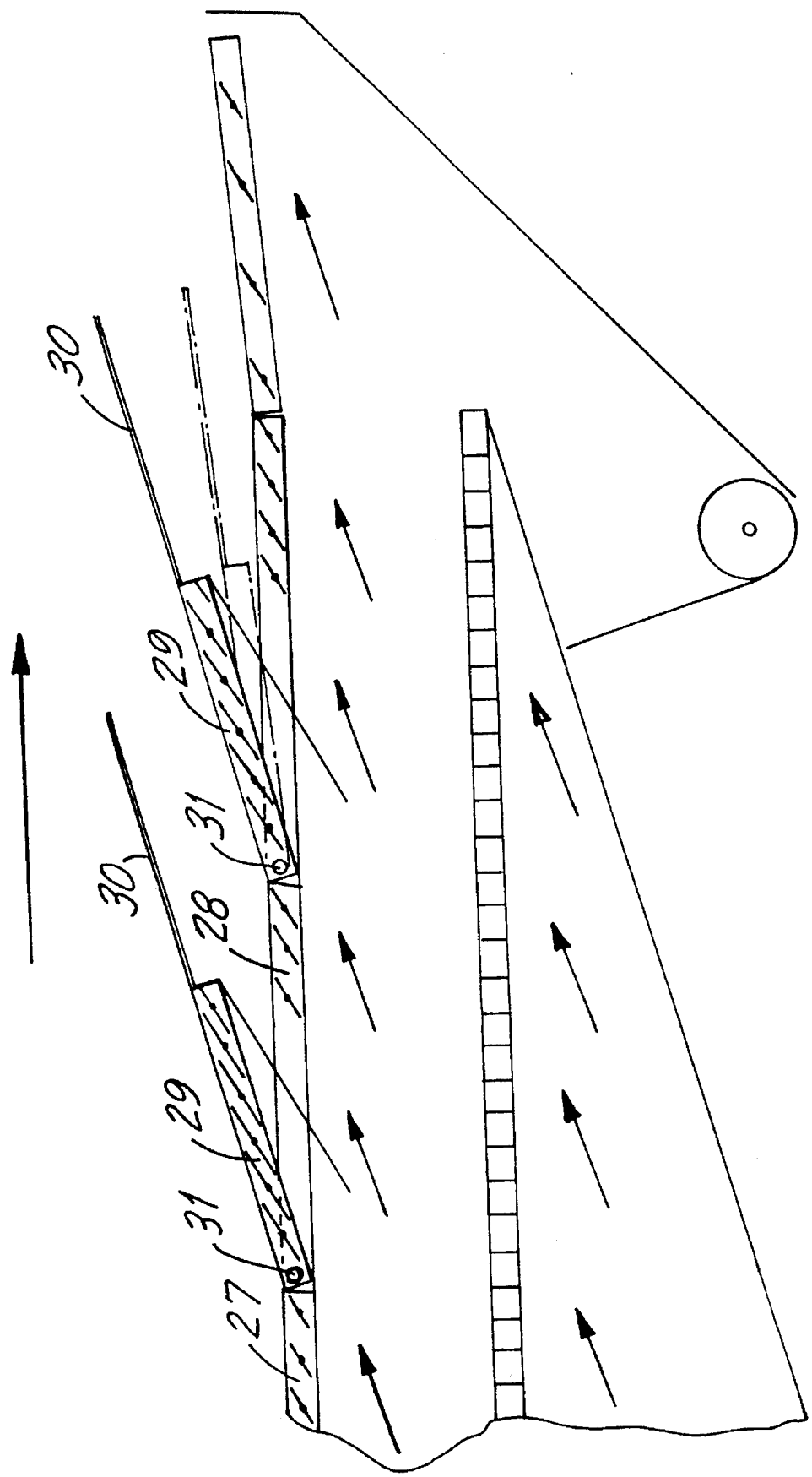
FIG. 3 shows an embodiment according to the invention comprising ascending sieve zones.

In other words, if sieve zone 33 is pivoted in FIG. 4 about pivot axis 32, the beginning 34 is lowered relative to base plane 28 whereas end 35 is lifted above base plane 28. Relative to base sieve 27, a drop step is thereby created passed by blower wind. Such drop step 36, as compared to FIG. 3, is developed in addition and increases the sieve performance.

Furtheron adjustable sieve zone 37 has the pivot axis 38 provided at the end of the sieve zone in the sieve zone plane. When pivoting, beginning 39 is lowered below base plane 28 while end 40 is not raised above base plane 28.

The embodiment as described may of course also be varied in different directions. Sieve zone 33 may have its pivot axis at 35 and sieve zone 37 may have its pivot axis at 39 or else in the middle of the sieve zone. It is also possible to place the pivot axis at any location between beginning and end of one sieve zone.

Figure 5:
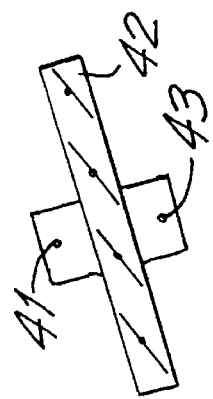
FIG. 5 shows the pivot axis arrangement of the sieve zones.

In order to enable forward-backward shift relative to base sieve 27, the pivot axes may also be disposed, vertically shifted, at the adjustable sieve zones. If the pivot axis in FIG. 5 for instance is disposed at 41, sieve zone 42 is shifted to one side, and if the pivot axis is disposed at 43, the sieve zone is shifted to the other side if adjustment each is made in the direction of rotation.

Based on the embodiments according to the invention it will therefore be possible to provide the most various positions of the adjustable sieve zones relative to the base sieve. In this way, for instance, optimization of the wind distribution in the sieve box is possible.

Sieve zones 29 are pivotably supported about pivot axis 31 and can be lifted from the sieve zone plane so that they form drop steps. Pivot axis 31 can be provided for instance at the beginning of sieve zone 29 which can be altered in its inclination.

As described above in detail, the pivot axis can also be provided at a different location of sieve zone 29 adjustable in its inclination and thus makes possible an adjustment of this sieve zone either by remote control or fully automatically by means of a sensor controlled depending on the inclination of the longitudinal axis of the machine relative to the horizontal.

In this latter case, the sensor normally emits electrical signals which are used to control a servomotor by means of which the adaptation of the inclination of sieve zone 29 is made.

Figure 6:
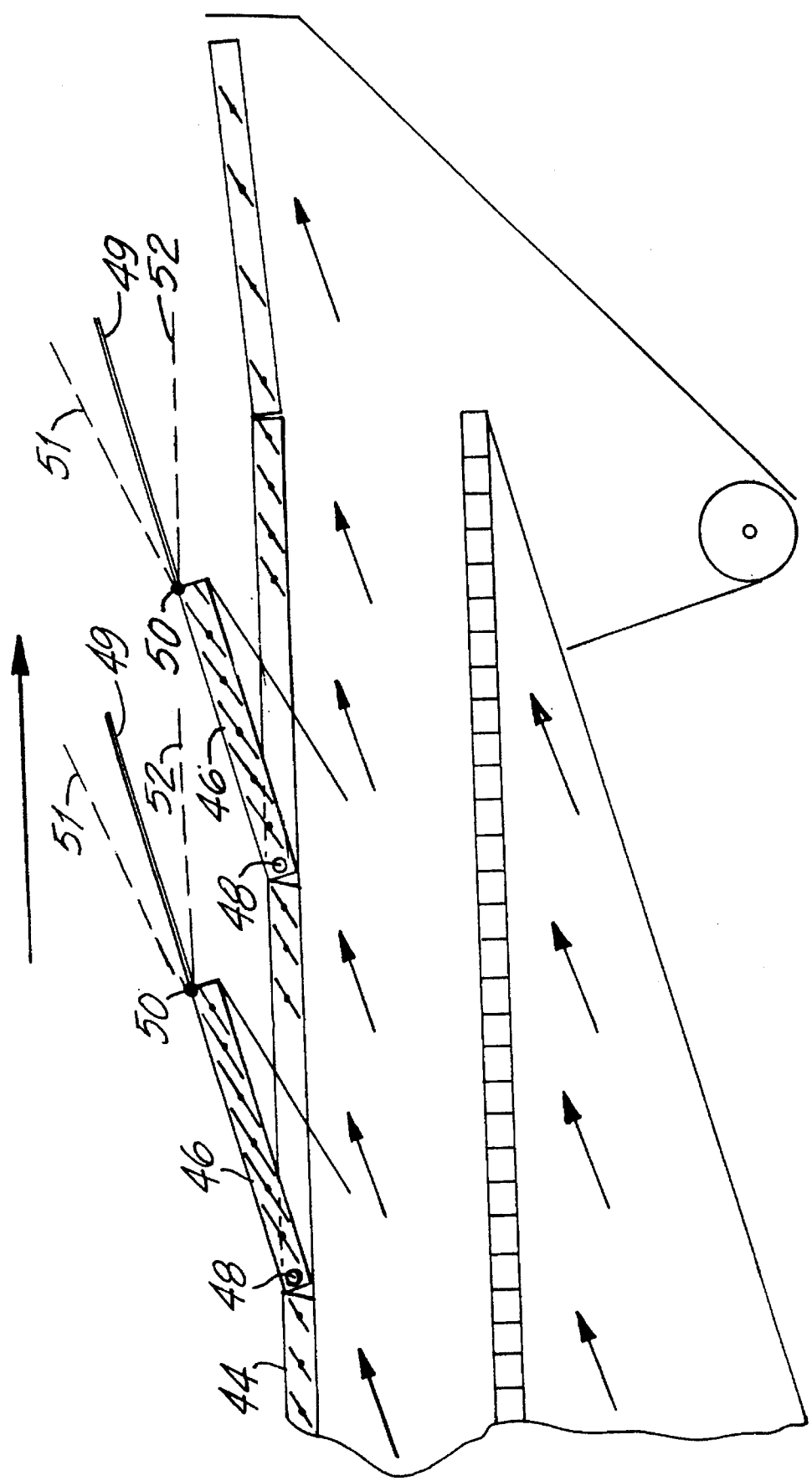
FIG. 6 shows an embodiment according to the invention comprising ascending sieve zones and prong rakes pivotable arranged thereon.

In FIG. 6, sieve zones 46 are pivotably supported at 48 relative to base plane 44 so that their inclination can be adjusted relative to base sieve 44.

Prong rakes 49 which hitherto have been rigidly connected to zones 46 can now alter their inclination relative to the base sieve as well as their inclination relative to sieve zone 46.

At 50, prong rakes 49 are pivotably secured about a horizontal axis and they can be pivoted about pivot axis 50, whereby the dashed representation of prong rakes 51 and 52 describes about the pivot range.

In the embodiment shown, sieve zones 46 are additionally pivotable about horizontal pivot axis 48 and thus can also correspondingly be adapted, as to their inclination, to the respective requirements.

Such adaptation can be made alone or in combination with the adaptation of prong rakes 49.

With a view to the light-weight embodiment of prong rakes 49, a fuller-automatic adaptation of the prong rake inclination by means of respective sensors can very simply be realized since relatively little material has to be moved in order to obtain such adjustment.

Based on the present invention, it is therefore possible, for instance when the machine is moving uphill, to fully automatically place the prong rakes into a more or less steeper position while, when travelling downhill a less steep position is automatically adjusted. The consequence is that when the machine is travelling uphill, the harvested crop to be separated is stopped by steeper-extending rakes 49, whereby the faster transport of the crop over the sieves which develops naturally when travelling uphill is stopped while, when travelling downhill, the position 52 of the prong rake will avoid collection of the harvested crop at the rakes and furtheron acceleration by the blower wind pushing through drop steps 53 is experienced because the crop gliding about the rakes constitutes a larger working surface for the air current.

We claim:

1. A cleaning sieve assembly for cleaning the harvested crop in combination with a conveyor for transporting the harvested crop of an agricultural harvesting machine, the sieve assembly being positioned below said conveyor and spaced therefrom and being passed with an air current from below and the harvested crop being transported by said sieve assembly by vibratory movement in one direction, the sieve assembly comprising an upper sieve receiving the crop from said conveyor; a lower sieve positioned below said upper sieve, said upper sieve having a plane and including a plurality of sieve zones extending over the complete width of said upper sieve, said sieve zones being inclined to said plane and being adjustable in an inclination thereof relative to said plane of said upper sieve so as to provide a drop step for the harvested crop between each preceding sieve zone and each subsequent sieve zone, each of said sieve zones ascending relative to the sieve plane; and prong rakes at each of the sieve zones.

2. Cleaning sieve assembly according to claim 1, wherein each of said sieve zones is shaped as a lamellar sieve.

3. Cleaning sieve assembly according to claim 1, wherein the sieve zones include openings and the upper sieve further comprises air conducting plates conducting an air current upwardly through the openings of said sieve zones.

4. Cleaning sieve assembly according to claim 1, wherein the prong rakes are pivotably secured to an edge of each of said sieve zones.

5. Cleaning sieve assembly according to claim 4, wherein said prong rakes are secured to a holder pivotable about a horizontal axis.

6. Cleaning sieve assembly according to claim 5, wherein said prong rakes are adjustable within a certain adjustment range relative to each of said sieve zones.

7. Cleaning sieve assembly according to claim 6 further comprising remote control means for adjusting said prong rakes.

8. Cleaning sieve assembly according to claim 6, further comprising sensors for automatically adjusting said prong rakes based upon the inclination of the machine.

9. Cleaning sieve assembly according to claim 4, wherein said prong rakes are adjustable within a certain adjustment range relative to each of said sieve zones.

10. Cleaning sieve assembly according to claim 9, further comprising remote control means for adjusting said prong rakes.

11. Cleaning sieve assembling according to claim 9, further comprising sensors for automatically adjusting said prong rakes based upon the inclination of the machine.

* * * * *